United States Patent
Wedzikowski et al.

(10) Patent No.: US 11,999,589 B2
(45) Date of Patent: Jun. 4, 2024

(54) MOBILE DEVICE STATE MANAGEMENT AND LOCATION DETERMINATION

(71) Applicants: Otis Elevator Company, Farmington, CT (US); Lucien Wedzikowski, Paris (FR)

(72) Inventors: Lucien Wedzikowski, Paris (FR); Bradley Armand Scoville, Farmington, CT (US); Ashley Chapman, Plainville, CT (US); Eric C. Peterson, East Longmeadow, MA (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1640 days.

(21) Appl. No.: 16/091,613

(22) PCT Filed: Apr. 6, 2016

(86) PCT No.: PCT/IB2016/000589
§ 371 (c)(1),
(2) Date: Oct. 5, 2018

(87) PCT Pub. No.: WO2017/175019
PCT Pub. Date: Oct. 12, 2017

(65) Prior Publication Data
US 2019/0152741 A1    May 23, 2019

(51) Int. Cl.
*B66B 1/46*    (2006.01)
*B66B 1/24*    (2006.01)
(Continued)

(52) U.S. Cl.
CPC ............ *B66B 1/468* (2013.01); *B66B 1/2408* (2013.01); *H04W 4/33* (2018.02); *H04W 76/10* (2018.02);
(Continued)

(58) Field of Classification Search
CPC . B66B 1/468; B66B 1/2408; B66B 2201/103; B66B 2201/4615; B66B 2201/4653; H04W 4/33; H04W 76/10
See application file for complete search history.

(56) References Cited

U.S. PATENT DOCUMENTS

| | | | |
|---|---|---|---|
| 6,073,075 A | 6/2000 | Kondou et al. | |
| 6,382,363 B1 | 5/2002 | Friedli | |

(Continued)

FOREIGN PATENT DOCUMENTS

| | | |
|---|---|---|
| CN | 103152487 A | 6/2013 |
| CN | 104276468 A | 1/2015 |

(Continued)

OTHER PUBLICATIONS

Korean Office Action for Application No. 10-2018-7032052; dated Oct. 28, 2022; 5 Pages.

(Continued)

*Primary Examiner* — Jeffrey Donels
(74) *Attorney, Agent, or Firm* — Cantor Colburn LLP (57) ABSTRACT

A system and method of managing an elevator system based on a location and status of a mobile device is provided. The method includes determining a current status of a mobile device, receiving a destination request from the mobile device, and dispatching an elevator car based on the destination request and the current status.

18 Claims, 6 Drawing Sheets

(51) Int. Cl.
*H04W 4/33* (2018.01)
*H04W 76/10* (2018.01)

(52) U.S. Cl.
CPC . *B66B 2201/103* (2013.01); *B66B 2201/4615* (2013.01); *B66B 2201/4653* (2013.01)

(56) References Cited

U.S. PATENT DOCUMENTS

| | | | |
|---|---|---|---|
| 6,397,976 B1 | 6/2002 | Hale et al. | |
| 6,868,945 B2 | 3/2005 | Schuster et al. | |
| 6,986,408 B2 | 1/2006 | Takeuchi | |
| 7,162,233 B2 | 1/2007 | Chiba | |
| 7,377,364 B2 | 5/2008 | Tyni et al. | |
| 7,500,544 B2 | 3/2009 | Hakala et al. | |
| 7,667,646 B2 | 2/2010 | Kalliola et al. | |
| 7,711,565 B1 * | 5/2010 | Gazdzinski | B66B 1/468 |
| | | | 369/30.01 |
| 7,751,829 B2 | 7/2010 | Masuoka et al. | |
| 8,068,836 B2 | 11/2011 | Voyer et al. | |
| 8,254,952 B2 | 8/2012 | Voyer et al. | |
| 8,350,758 B1 | 1/2013 | Parvizi et al. | |
| 8,362,949 B2 | 1/2013 | Yang et al. | |
| 8,485,317 B2 | 7/2013 | Gerstenkorn et al. | |
| 8,684,142 B2 | 4/2014 | Finschi | |
| 8,880,200 B2 | 11/2014 | Nowel | |
| 8,909,258 B2 | 12/2014 | Tidd et al. | |
| 8,944,219 B2 | 2/2015 | Gerstenkorn | |
| 8,960,373 B2 | 2/2015 | De Vincentis | |
| 9,046,373 B2 | 6/2015 | Bandyopadhyay et al. | |
| 9,110,159 B2 | 8/2015 | Vartanian et al. | |
| 9,237,422 B1 | 1/2016 | Bhat et al. | |
| 2007/0041352 A1 * | 2/2007 | Frankel | B66B 1/468 |
| | | | 370/338 |
| 2011/0121963 A1 | 5/2011 | Prehofer | |
| 2012/0048655 A1 | 3/2012 | Hsu | |
| 2013/0231131 A1 | 9/2013 | Di Cera Colazingari | |
| 2013/0245832 A1 | 9/2013 | Blom et al. | |
| 2014/0131142 A1 | 5/2014 | Parkkinen et al. | |
| 2015/0018018 A1 | 1/2015 | Shen et al. | |
| 2015/0090534 A1 | 4/2015 | Finsch | |
| 2015/0149133 A1 | 5/2015 | Do | |
| 2015/0187266 A1 | 7/2015 | Qian et al. | |
| 2015/0251874 A1 | 9/2015 | Salmikuukka | |
| 2015/0350845 A1 * | 12/2015 | Patel | H04W 4/029 |
| | | | 455/457 |
| 2016/0009525 A1 | 1/2016 | Depaola et al. | |
| 2016/0016756 A1 | 1/2016 | Elomaa | |
| 2016/0031676 A1 | 2/2016 | Haipus | |
| 2017/0137255 A1 * | 5/2017 | Simcik | B32B 27/08 |

FOREIGN PATENT DOCUMENTS

| | | | |
|---|---|---|---|
| CN | 104599354 A | 5/2015 | |
| EP | 2848569 A1 | 3/2015 | |
| JP | 2005280906 A | 10/2005 | |
| JP | 2010215302 A | 9/2010 | |
| JP | 2015168510 A | 9/2015 | |
| WO | 02066357 A1 | 8/2002 | |
| WO | 2014116182 A1 | 7/2014 | |
| WO | WO-2014161598 A1 * | 10/2014 | B66B 1/2408 |
| WO | 2014186946 A1 | 11/2014 | |
| WO | 2015094178 A1 | 6/2015 | |
| WO | 2015187266 A1 | 12/2015 | |
| WO | WO-2015187266 A1 * | 12/2015 | B32B 27/08 |
| WO | 2016023576 A1 | 2/2016 | |

OTHER PUBLICATIONS

Chinese Office Action for application CN 201680084782.9, dated Mar. 16, 2020, 51 pages.
Anthony; "Think GPS is cool? IPS will blow your mind"; Apr. 2012; Internet; URL: http://www.extremetech.com; 20 pgs.
ISR and Written Opinion for application PCT/IB2016/000589, dated Dec. 15, 2016, 10 pages.
Robarts; "myPORT app unlocks doors and calls elevators for you"; Gizmag; Dec. 2015; 5 pgs.
Indian Office Action for Application No. 201717039106; dated Feb. 24, 2021; 6 Pages.

* cited by examiner

MOBILE DEVICE STATE MANAGEMENT AND LOCATION DETERMINATION

TECHNICAL FIELD

The subject matter disclosed herein generally relates using a mobile device with an elevator system and, more particularly, to determining a location and status of the mobile device in relation to the elevator system.

DESCRIPTION OF RELATED ART

Typical elevator interface devices are installed at known fixed locations. For example, elevator call buttons are typically installed in the wall of a building and proximate to the doors of the elevator. Using such fixed interface devices may inherently create challenges for the user. Particularly, determining the specific location of the user within the building does not lend itself well to being calculated based on a few stationary call inputs at a fixed interface location.

In some elevator systems, user smartphone applications enable the user to place an elevator call remotely from the fixed interface devices. However, these applications typically are unable to determine the location of the user or which on floor the user is located. Thus, in order to compensate for this lack of tracking capability within the building, a user typically must enter both their present floor and their desired destination floor.

Accordingly, a method and system that can better track the user is desired.

SUMMARY

According to one embodiment a method of managing an elevator system based on a location and status of a mobile device is provided. The method includes determining a current status of a mobile device, receiving a destination request from the mobile device, and dispatching an elevator car based on the destination request and the current status.

In addition to one or more of the features described above, or as an alternative, further embodiments may include wherein the destination request includes a destination floor.

In addition to one or more of the features described above, or as an alternative, further embodiments may include wherein determining the current status includes determining a location of the mobile device.

In addition to one or more of the features described above, or as an alternative, further embodiments may include wherein determining the location of the mobile device includes comparing, using the mobile device, multiple radio frequency signal strengths from multiple wireless devices that the mobile device can communicate with, wherein the multiple wireless devices includes devices installed in the building and other mobile devices in the building, and determining the location of the mobile device based on the comparison.

In addition to one or more of the features described above, or as an alternative, further embodiments may include wherein determining the location of the mobile device includes establishing a wireless connection between the mobile device and a real-time location system installed in the building, determining, using the real-time location system, the location of the mobile device based on the portion of the real-time location system the mobile device connects with, and receiving the location from the real-time location system at an elevator controller.

In addition to one or more of the features described above, or as an alternative, further embodiments may include wherein determining the location of the mobile device includes using one or more of trilateration, triangulation, GPS, differential GPS, WiFi receiver, Bluetooth receiver, sensors, beacons, and access points distributed throughout the building.

In addition to one or more of the features described above, or as an alternative, further embodiments may include wherein determining the current status includes receiving a record of past statuses of the mobile device, receiving a location of the mobile device, generating the current status of the mobile device based on the record, location, and destination request, and providing an elevator service based on the current status of the mobile device.

In addition to one or more of the features described above, or as an alternative, further embodiments may include storing the current status in the record of past statuses of the mobile device.

In addition to one or more of the features described above, or as an alternative, further embodiments may include wherein the elevator service is at least one selected from a group consisting of not calling an elevator, calling an elevator, calling a second elevator, and parking an elevator near the location of the mobile device.

In addition to one or more of the features described above, or as an alternative, further embodiments may include wherein the current status of the mobile device includes one or more of a no intent to use elevator status, an idle approaching of the elevator status, a manual call request status, an automatic call request status, a waiting for elevator status, a boarded elevator status, and an exited at destination floor status.

According to an embodiment, a system for managing an elevator system based on a location and status of a mobile device is provided. The system includes at least one mobile device including a current status and location, wherein the mobile device is configured to generate and transmit a destination request, at least one sensor configured to collect sensor data that is analyzed and used to determine the location and current status of the mobile device, and an elevator system including an elevator controller and at least one elevator car, wherein the elevator controller dispatches the one or more elevator cars based on the location, current status, and destination request from the mobile device.

In addition to one or more of the features described above, or as an alternative, further embodiments may include wherein the current status is a location defined status of the mobile device, wherein the location of the mobile device is determined in a building using a wireless detection system.

According to an embodiment, a computer program product for managing an elevator system based on a location and status of a mobile device is provided. The computer program product including a computer readable storage medium having program instructions embodied therewith, the program instructions executable by a processor to cause the processor to determine a current status of a mobile device, receive a destination request from the mobile device, and dispatch an elevator car based on the destination request and the current status.

In addition to one or more of the features described above, or as an alternative, further embodiments may include additional program instructions executable by the processor to cause the processor to determine a location of the mobile device.

In addition to one or more of the features described above, or as an alternative, further embodiments may include additional program instructions executable by the processor to cause the processor to compare, using the mobile device, multiple radio frequency signal strengths from multiple wireless devices that the mobile device can communicate with, wherein the multiple wireless devices includes devices installed in the building and other mobile devices in the building, and determine the location of the mobile device based on the comparison.

In addition to one or more of the features described above, or as an alternative, further embodiments may include additional program instructions executable by the processor to cause the processor to establish a wireless connection between the mobile device and a real-time location system installed in the building, determine, using the real-time location system, the location of the mobile device based on the portion of the real-time location system the mobile device connects with, and receive the location from the real-time location system at an elevator controller.

In addition to one or more of the features described above, or as an alternative, further embodiments may include additional program instructions executable by the processor to cause the processor to use one or more of trilateration, triangulation, GPS, differential GPS, WiFi receiver, Bluetooth receiver, sensors, beacons, and access points distributed throughout the building to determine the location of the mobile device.

In addition to one or more of the features described above, or as an alternative, further embodiments may include additional program instructions executable by the processor to cause the processor to receive a record of past statuses of the mobile device, receive a location of the mobile device, generate the current status of the mobile device based on the record, location, and destination request, and provide an elevator service based on the current status of the mobile device In addition to one or more of the features described above, or as an alternative, further embodiments may include additional program instructions executable by the processor to cause the processor to store the current status in the record of past statuses of the mobile device.

In addition to one or more of the features described above, or as an alternative, further embodiments may include additional program instructions executable by the processor to cause the processor to select the elevator service from a group consisting of not calling an elevator, calling an elevator, calling a second elevator, and parking an elevator near the location of the mobile device, and include in the current status of the mobile device one or more of a no intent to use elevator status, an idle approaching of the elevator status, a manual call request status, an automatic call request status, a waiting for elevator status, a boarded elevator status, and an exited at destination floor status.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Embodiments described herein are directed to a method and system for managing an elevator system based on a location and status of a mobile device. For example, according to one or more embodiments, a system is provided that can sense or detect a user's status and manage the user's status to provide advanced functionality including automatic calls.

Some examples of different user statuses include, but are not limited to: the floor a user is located on, the intent of a user to enter or exit a specific elevator, a no-intent to use the elevator status, an idle approaching elevator status, a manual call request status, an automatic call request status, a waiting for elevator status, a boarded elevator status, and an exited at destination floor status. Some benefits that may be provided include automatic call management, user tracking to feed into emergency crews, and smart elevator parking.

Further, according to one or more embodiments, a method to learn the user's floor location and x, y position on a floor is provided. The floor location and the position on that floor can be used with, and also to determine, a current status of the mobile device. For example, according to one embodiment, a mobile device compares averaged RF signal strengths from multiple wireless devices including other mobile devices to help determine its location in a building. Specifically, according to an embodiment, many wireless devices coordinate with each other to determine where a mobile device is located by comparing signals from the mobile device at the different wireless devices. According to yet another embodiment, the elevator system is coupled with 3rd party real-time location system that the mobile device can communicate directly to a real-time location system. One or more benefits include that the user does not need to enter a starting floor into the application on their mobile device. Further, according to another embodiment, based on knowing user's starting floor we can trigger automatic calls that are preset by the user. According to another embodiment, the system can help guide a user to the correct elevator and beyond that to their final destination.

Figure 1:
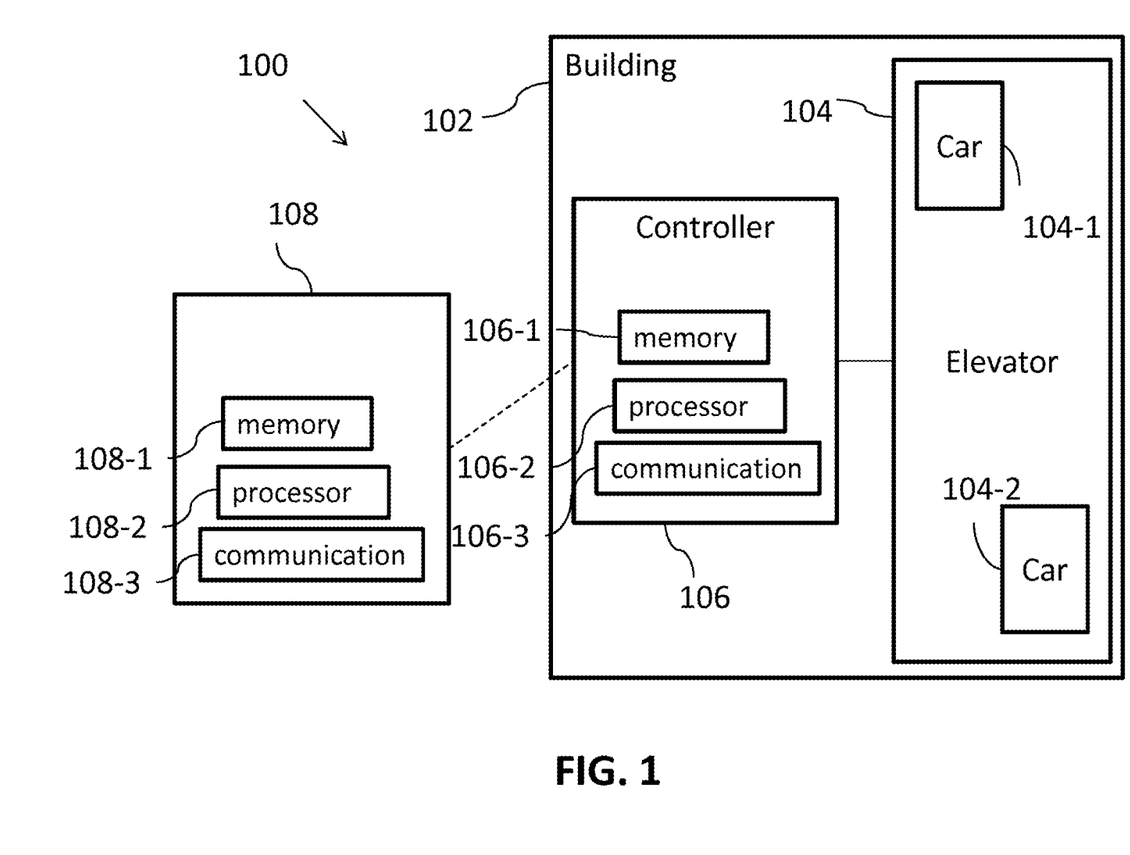
FIG. 1 depicts an elevator system in accordance with one or more embodiments of the present disclosure.

Turning now to the figures, FIG. 1 depicts an elevator system 100 in accordance with one or more embodiments. The elevator system 100 is shown installed at a building 102. In some embodiments, the building 102 may be an office building or a collection of office buildings that may or may not be physically located near each other. The building 102 may include a number of floors. Persons entering the building 102 may enter at a lobby floor, or any other floor, and may go to a destination floor via one or more conveyance devices, such as an elevator 104.

The elevator 104 may be coupled to one or more computing devices, such as a controller 106. The controller 106 may be configured to control dispatching operations for one or more elevator cars (e.g., cars 104-1, 104-2) associated with the elevator 104. The elevator cars 104-1 and 104-2 may be located in the same hoist way or in different hoist ways so as to allow coordination amongst elevator cars in different elevator banks serving different floors. It is understood that other components of the elevator system 100 (e.g., drive, counterweight, safeties, etc.) are not depicted for ease of illustration.

Also shown in FIG. 1 is a mobile device 108. The mobile device 108 may include a device that is typically carried by a person, such as a phone, PDA, electronic wearable, RFID tag, laptop, tablet, watch, or any other known portable mobile device. The mobile device 108 may include a processor 108-2, a memory 108-1, and a communication module 108-3 as shown in FIG. 1. The processor 108-2 can be any type or combination of computer processors, such as a microprocessor, microcontroller, digital signal processor, application specific integrated circuit, programmable logic device, and/or field programmable gate array. The memory 108-1 is an example of a non-transitory computer readable storage medium tangibly embodied in the mobile device 108 including executable instructions stored therein, for instance, as firmware. The communication module 108-3 may implement one or more communication protocols as described in further detail herein.

The controller 106 may include a processor 106-2, a memory 106-1, and communication module 106-3 as shown in FIG. 1. The processor 106-2 can be any type or combination of computer processors, such as a microprocessor, microcontroller, digital signal processor, application specific integrated circuit, programmable logic device, and/or field programmable gate array. The memory 106-1 is an example of a non-transitory computer readable storage medium tangibly embodied in the controller 106 including executable instructions stored therein, for instance, as firmware. The communication module 106-3 may implement one or more communication protocols as described in further detail herein.

The mobile device 108 and the controller 106 communicate with one another. According to one or more embodiments, the communication between the mobile device 108 and the controller 106 is done through other systems such as transmitters, converters, receivers, and other transmitting and processing elements depending on the communication type selected. For example, the mobile device 108 and the controller 106 may communicate with one another when proximate to one another (e.g., within a threshold distance). The mobile device 108 and the controller 106 may communicate over a wireless network, such as 802.11x (WiFi), short-range radio (Bluetooth), or any other known type of wireless communication. In some embodiments, the controller 106 may include, or be associated with (e.g., communicatively coupled to) a networked element, such as kiosk, beacon, hall call fixture, lantern, bridge, router, network node, etc. The networked element may communicate with the mobile device 108 using one or more communication protocols or standards. For example, the networked element may communicate with the mobile device 108 using near field communications (NFC), or any type of known wired or wireless communication means. According to one or more other embodiments, the networked element may communicate with the mobile device 108 through a cellular network or over the internet through a number of other devices outside the building.

In other embodiments, the controller 106 may establish communication with a mobile device 108 that is outside of the building 102. This connection may be established with various technologies including GPS, triangulation, or signal strength detection, by way of non-limiting example. The communication connection that can be established includes, but is not limited to, a cellular connection, a WiFi connection, a Bluetooth connection, a peer-to-peer connection, a satellite connection, a NFC connection, some other wireless connection, and even a wired connection using an Ethernet cable, coaxial cable, or other data cable. These communication connections may transport data between the mobile device 108 using a number of different networks ranging from a private secure direct communication link to transporting the data over the internet through multiple different servers, switches, etc. Such technologies that allow early communication will provide users and the systems more time to establish the most efficient passenger flow, and may eliminate the need for a user to stop moving to interact with the system.

Implementation of a method and system of managing an elevator system based on a location and status of a mobile device using the mobile device, controller, and elevator is described with reference to FIGS. 2-6.

Figure 2:
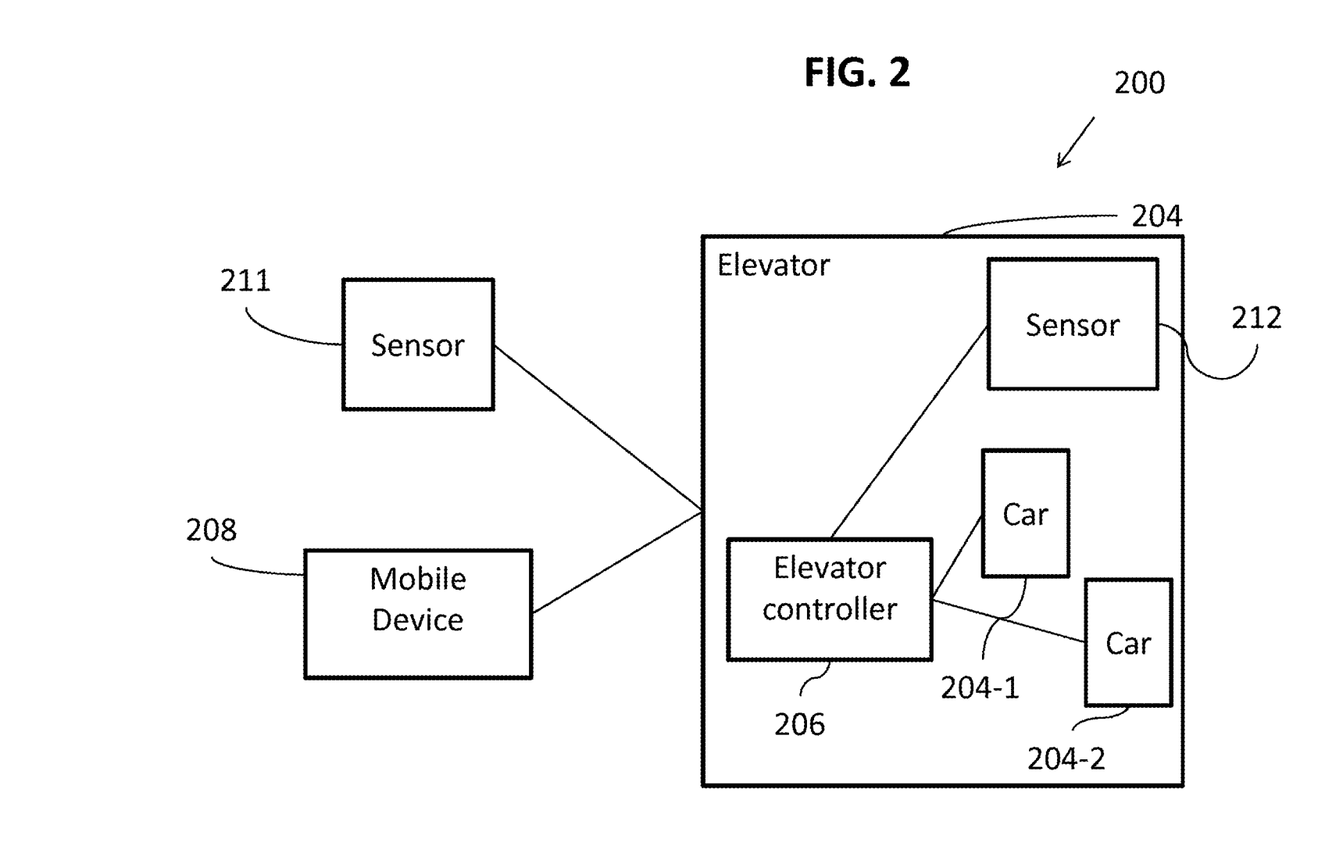
FIG. 2 depicts a system for managing an elevator system based on a location and status of a mobile device in accordance with one or more embodiments of the present disclosure.

Referring to FIG. 2, a system 200 for managing an elevator system 204 based on a location and status of a mobile device 208 is shown in accordance with one or more embodiments of the present disclosure. The system 200 includes at least one elevator 204, a mobile device 208 a lobby sensor 211, and an elevator sensor 212. The sensors 211, 212 may be any known sensor that can be used to detect the presence and location of a user. For example, the sensors 211, 212 can be communication devices that wirelessly communicate with a mobile device 208. The communication process provides data that can be processed to determine a location of the mobile device 208. According to another embodiment, the sensors, 211, and 212 can be image sensors that collect image data than can be processed to detect the presence and location of users. Further, the sensors 211, 212 may be other sensor types such as microphones, weighting devices, or other known wireless devices. According to one or more embodiments, the system 200 may also include a plurality of mobile devices 208, touch screens, fixed displays, and/or sensors. The elevator 204 includes one or more cars 204-1, 204-2 as well as a controller 206. The elevator controller 206 is shown within the elevator system 100, but may be located elsewhere as shown in FIG. 1.

Figures 3A, 3B, 3C:
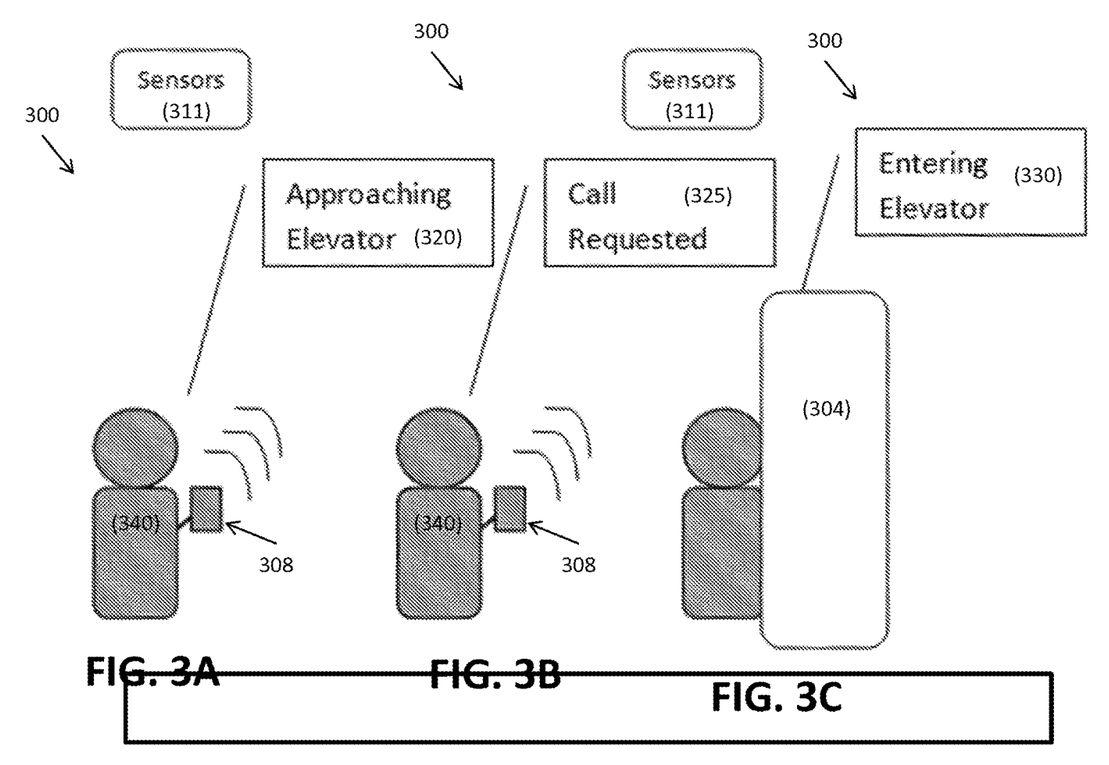
FIGS. 3A through 3C depict a user at different steps in a method of using a system for managing an elevator system based on a location and status of a mobile device in accordance with one or more embodiments of the present disclosure.

Turning now to FIGS. 3A Through 3C, a user 340 at different stages during a method of using a system for managing an elevator system based on a location and status of a mobile device 308 is shown in accordance with one or more embodiments of the present disclosure. As shown, the user 340 carries a mobile device 308. A shown in FIG. 3A, the user approaches an elevator which can be detected by sensors 311. The sensors 311 may be located anywhere in the building. For example, the sensors 311 may be placed in hallways in buildings, in elevator lobbies, in elevator cars, and anywhere else were a user can be tracked. The sensor type can be any known type of sensor that can be used to determine a location of a user and/or mobile device. For example the sensor may be a communication sensor that transmits signals to a mobile device using Bluetooth, wifi, local cell hotspots, or some other form of wireless communication. The sensors may also be image sensors, temperature sensors, or a combination of other types of sensors who collected data can be processed to provide a user location.

Further, as shown the user 340 approaches the elevator 306 drawing closer which may trigger a command once a certain location is met. For example, according to one or more embodiments, when the user mobile device 308 is within wireless range of the sensor 311 the command is triggered to call an elevator 306. For example, as shown in FIG. 3B, as the user 340, approaches the elevator 306, the user's mobile device 308 transmitted the call request. Accordingly, as shown in FIG. 3C the user 340 can directly enter the elevator with limited to no delay because of the earlier detection and requesting when the mobile device 308 entered the wireless communication range of the sensor 311.

Figure 4:
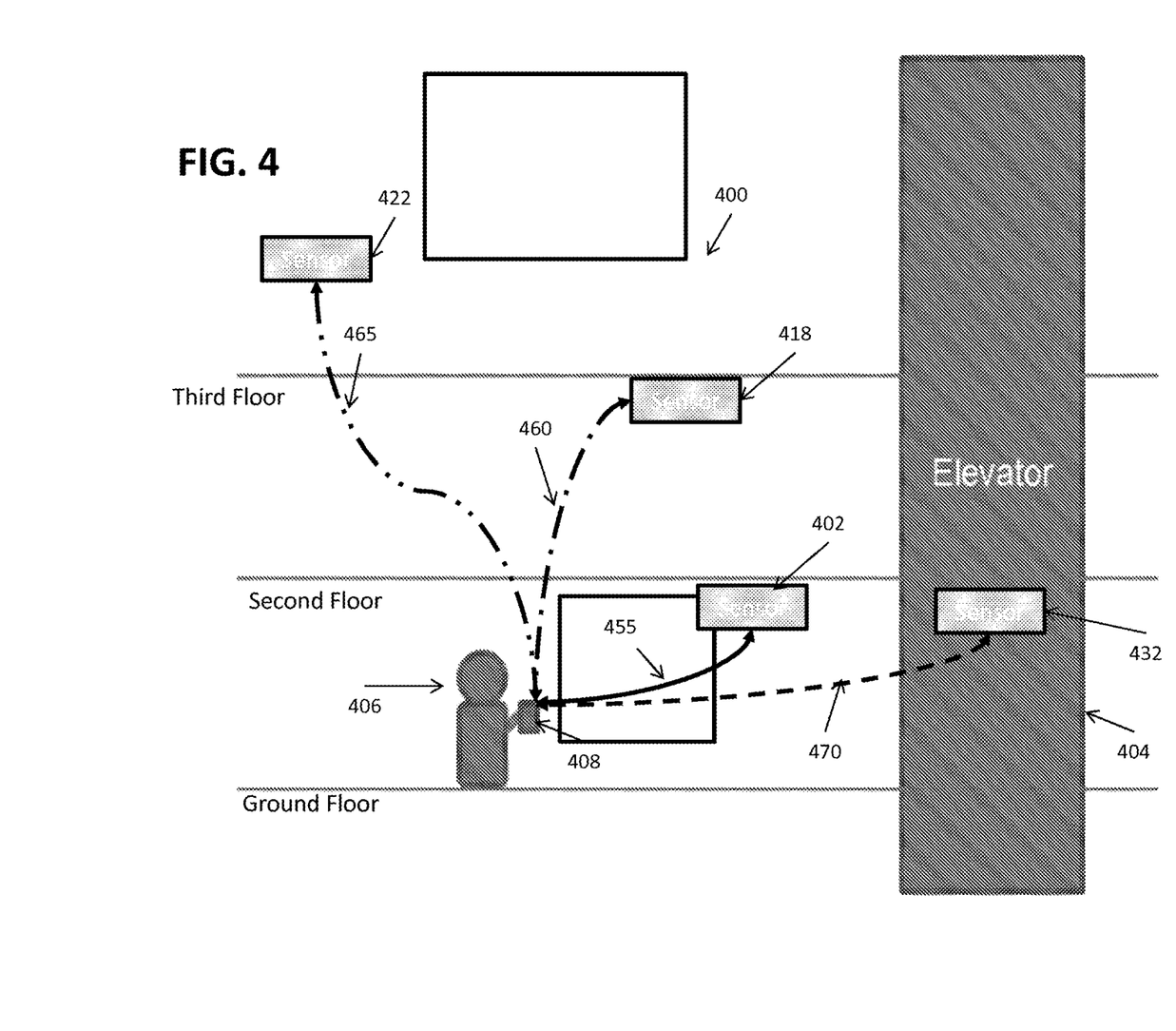
FIG. 4 depicts a user using a system and method for managing an elevator system based on a location and status of a mobile device in accordance with one or more embodiments of the present disclosure.

FIG. 4 depicts a user 406 using a system 400 and method for managing an elevator system 404 based on a location and status of a mobile device in accordance with one or more embodiments of the present disclosure. As shown, the mobile device 408 of the user 406 wirelessly communicates with a plurality of different sensors 402, 418, 422, 432 that are provided at different locations, on different floors, and some sensors within the elevator. For example, the user's mobile device 408 might communicate with sensor 402 on the ground floor of the building, sensor 418 on the second floor of the building, and sensor 422 on the third floor of the building. In addition, the user's mobile device may communicate with optional sensor 432 located in the elevator 404. As the distance between the mobile device 408 and a sensor increases, typically there will be proportional degradation in the strength and clarity of the signal as well as an addition of noise. According to one or more embodiments, the degradation is due to environment resulting in multipath signal transmission. Also, noise from other wireless transmission and equipment in the building be further degrade the signal of interest. When the mobile device 408 and sensors are separated by the floor of the building, such as mobile device 408 located on the ground floor of the building and sensor 418 located on the second floor of the building, this degradation of signal strength and clarity and excess noise is typically more pronounced. Software located on the mobile device 408, or on the elevator controller, analyzes the relative signal strengths, clarities and/or noise levels between the mobile device 408 and sensors 402, 418, 422, 432 to determine which sensor 402, 418, 422, 432 the mobile device is closest too. In one embodiment, the mobile device is typically closest to the sensor 402, 418, 422, 432 with the highest signal strength, greatest clarity, and/or the lowest noise levels. The change in the signal between the sensors 402, 418, 422, 432 and the mobile device 408 can be analyzed used to determine how far the sensor is from the mobile device 408. The signal profiles of the sensors 402, 418, 422, 432 coan be mapped to indicate a particular distance that exists between the mobile device 408 and the sensor 422. Using these signal profiles from each sensor provides one with the ability to accurately predict the location of the mobile device 408 and user 406. In accordance with one or more embodiments, the method and system may have to implement time averaging due to noise. The average value will enable higher confidence in the value and the resulting decision from the comparison on multiple signals.

It should be noted that where the sensor 432 is installed inside the elevator 404, the metal walls of the elevator and walls of the elevator shaft may act as Faraday cage, further diminishing signal strength, clarity, and increasing noise. FIGS. 5A and 5B depict different locations and status of a mobile device in a system and method of managing an elevator system based on a location and status of the mobile device in accordance with one or more embodiments of the present disclosure.

Figure 5:
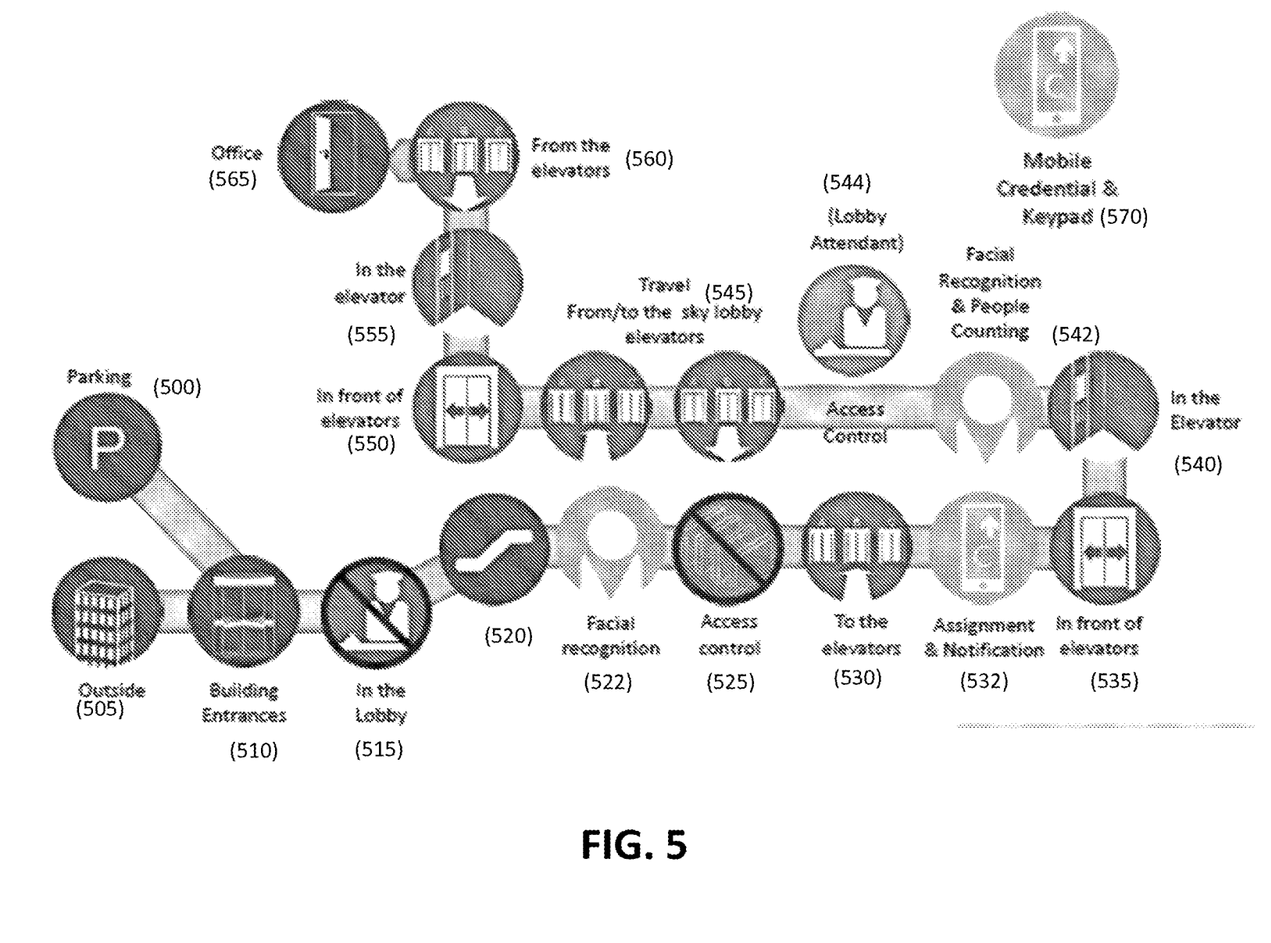
FIG. 5 depicts different locations and status a mobile device can be in for use with a system and method of managing an elevator system based on a location and status of the mobile device in accordance with one or more embodiments of the present disclosure.

Turning first to FIG. 5, in one exemplary embodiment, a user carrying a mobile device may arrive at the parking lot of the building 500 or some other location 505 on the exterior of the building. Next the user carrying the mobile device will transition through the building entrance 510, to the lobby, 515, and possibly up some stairs 520 and then through access control 525. Access control or the user's mobile device may then instruct the user as to which elevator or elevator back to use. In one embodiment, this assignment may occur later in the process. Next the user carrying the mobile device can travel to the elevators 530 and can position themselves in front of the previously indicated elevator 535. Further, the user carrying the mobile device can enter into the elevator 540. Further, the mobile device can then exit and enter other elevators from a sky lobby elevator bank 545. Again here, the mobile device can line up in front of the elevator 550 corresponding to the second call made from the sky lobby. The mobile device then enters the elevator 555 and arrives at their desired location elevator bank 560. From there the mobile device can be detected as arriving at the user's office 565. According to another embodiment, the mobile device may include a mobile credential and a keypad 570.

Looking at FIG. 5, the embodiment is shown that is substantially similar to that discussed above expect with some items have been removed while adding a few others. Particularly, in this embodiment it can be appreciated that both the in the lobby portion 515 and the access control 525 have been removed. Further, in this embodiment, facial recognition 522, assignment and notification 532, facial recognition of people counting 542, and the lobby attendant 544 have been added.

Figure 6:
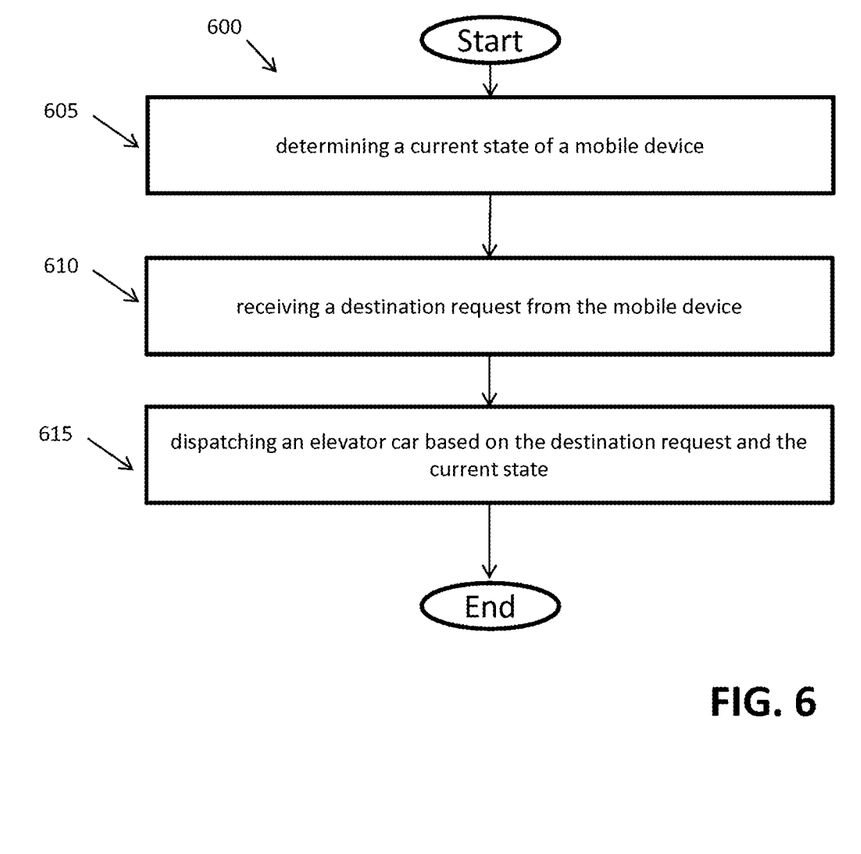
FIG. 6 depicts a flow diagram of a method of managing an elevator system based on a location and status of a mobile device in accordance with one or more embodiments of the present disclosure.

FIG. 6 depicts a flow diagram of a method 600 of managing an elevator system based on a location and status of a mobile device in accordance with one or more embodiments of the present disclosure. The method 600 includes determining a current status of a mobile device (operation 605). The method 600 further includes receiving a destination request from the mobile device (operation 610). Further, the method 600 includes dispatching an elevator car based on the destination request and the current status (operation 615).

According to another embodiment, A method of mobile device managing its current status in a state machine can be provided. The method is based on past statuses and events to transition to a new status. The elevator system or mobile device takes action based on a status transition and providing appropriate service. Elevator system can also manage the current status of every user.

According to another embodiment, the method can include receiving the location from the real-time location system at an elevator controller. According to one or more embodiments, two different tiers of location are of interest. The first location is provided to the elevator that definitely should know what floor the mobile device/person is located on. Another location of interest is the user's location on the floor relative to all elevators to make a better informed decision. According to another embodiment, the system will also track their position after entering a request to make sure they board.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the embodiments in the form disclosed. Many modifications and variations will be apparent to those of ordinary skill in the art without departing from the scope of the disclosure. The embodiments were chosen and described in order to best explain the principles of the disclosure and the practical application, and to enable others of ordinary skill in the art to understand various embodiments with various modifications as are suited to the particular use contemplated.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

The computer readable program instructions may execute entirely on the user's mobile device, partly on the user's mobile device, as a stand-alone software package, partly on the user's mobile device and partly on a remote computer or entirely on the remote computer or server. In the latter scenario, the remote computer may be connected to the user's mobile device through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing status information of the computer readable program instructions to personalize the electronic circuitry, in order to perform aspects of the present disclosure.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the present disclosure is not to be seen as limited by the foregoing description, but is only limited by the scope of the appended claims.

What is claimed is:

1. A method of managing an elevator system based on a location and status of a mobile device, the method comprising:
    determining a current status of a mobile device;
    determining a location of the mobile device;
    receiving a destination request from the mobile device; and
    dispatching an elevator car based on the destination request and the current status;
    wherein the current status comprises one or more of a no intent to use elevator status, an idle approaching of the elevator status, a waiting for elevator status, a boarded elevator status, and an exited at destination floor status.

2. The method of claim 1, wherein the destination request includes a destination floor.

3. The method of claim 1, wherein determining the location of the mobile device comprises:
    comparing, using the mobile device, multiple radio frequency signal strengths from multiple wireless devices that the mobile device can communicate with, wherein the multiple wireless devices includes devices installed in the building and other mobile devices in the building; and determining the location of the mobile device based on the comparison.

4. The method of claim 1, wherein determining the location of the mobile device comprises:

establishing a wireless connection between the mobile device and a real-time location system installed in the building;

determining, using the real-time location system, the location of the mobile device based on the portion of the real-time location system the mobile device connects with; and receiving the location from the real-time location system at an elevator controller.

5. The method of claim 1, wherein determining the location of the mobile device comprises using one or more of trilateration, triangulation, GPS, differential GPS, WiFi receiver, Bluetooth receiver, sensors, beacons, and access points distributed throughout the building.

6. The method of claim 1, wherein determining the current status comprises:

receiving a record of past statuses of the mobile device;
receiving a location of the mobile device;
generating the current status of the mobile device based on the record, location, and destination request; and
providing an elevator service based on the current status of the mobile device.

7. The method of claim 6, further comprising:
storing the current status in the record of past statuses of the mobile device.

8. The method of claim 6, wherein the elevator service is at least one selected from a group consisting of not calling an elevator, calling an elevator, calling a second elevator, and parking an elevator near the location of the mobile device.

9. A system for managing an elevator system based on a location and status of a mobile device, the system comprising:

at least one mobile device comprising a current status and location, wherein the mobile device is configured to generate and transmit a destination request;

at least one sensor configured to collect sensor data that is analyzed and used to determine the location and current status of the mobile device; and an elevator system comprising an elevator controller and at least one elevator car, wherein the elevator controller dispatches the one or more elevator cars based on the location, current status, and destination request from the mobile device;

wherein the current status comprises one or more of a no intent to use elevator status, an idle approaching of the elevator status, a waiting for elevator status, a boarded elevator status, and an exited at destination floor status.

10. The system of claim 9, wherein the current status is a location defined status of the mobile device, wherein the location of the mobile device is determined in a building using a wireless detection system.

11. A computer program product for managing an elevator system based on a location and status of a mobile device, the computer program product comprising a non-transitory computer readable storage medium having program instructions embodied therewith, the program instructions executable by a processor to cause the processor to:

determine a current status of a mobile device;

determine a location of the mobile device;
receive a destination request from the mobile device; and
dispatch an elevator car based on the destination request and the current status;

wherein the current status comprises one or more of a no intent to use elevator status, an idle approaching of the elevator status, a waiting for elevator status, a boarded elevator status, and an exited at destination floor status.

12. The computer program product of claim 11, the computer program product comprising additional program instructions executable by the processor to cause the processor to:

determine a location of the mobile device.

13. The computer program product of claim 12, the computer program product comprising additional program instructions executable by the processor to cause the processor to:

compare, using the mobile device, multiple radio frequency signal strengths from multiple wireless devices that the mobile device can communicate with, wherein the multiple wireless devices includes devices installed in the building and other mobile devices in the building; and determine the location of the mobile device based on the comparison.

14. The computer program product of claim 12, the computer program product comprising additional program instructions executable by the processor to cause the processor to:

establish a wireless connection between the mobile device and a real-time location system installed in the building;

determine, using the real-time location system, the location of the mobile device based on the portion of the real-time location system the mobile device connects with; and receive the location from the real-time location system at an elevator controller.

15. The computer program product of claim 12, the computer program product comprising additional program instructions executable by the processor to cause the processor to:

use one or more of trilateration, triangulation, GPS, differential GPS, WiFi receiver, Bluetooth receiver, sensors, beacons, and access points distributed throughout the building to determine the location of the mobile device.

16. The computer program product of claim 11, the computer program product comprising additional program instructions executable by the processor to cause the processor to:

receive a record of past statuses of the mobile device;
receive a location of the mobile device;
generate the current status of the mobile device based on the record, location, and destination request; and
provide an elevator service based on the current status of the mobile device.

17. The computer program product of claim 11, the computer program product comprising additional program instructions executable by the processor to cause the processor to:

store the current status in the record of past statuses of the mobile device.

18. The computer program product of claim 11, the computer program product comprising additional program instructions executable by the processor to cause the processor to:

select the elevator service from a group consisting of not calling an elevator, calling an elevator, calling a second elevator, and parking an elevator near the location of the mobile device.

\* \* \* \* \*